United States Patent
Chen et al.

(10) Patent No.: US 11,713,253 B2
(45) Date of Patent: Aug. 1, 2023

(54) MAGNESIUM-ALUMINUM HYDROTALCITE-LOADED NANO ZERO-VALENT IRON COMPOSITE MATERIAL, METHOD FOR PREPARING SAME AND USE THEREOF

(71) Applicant: NANJING HYDRAULIC RESEARCH INSTITUTE, Nanjing (CN)

(72) Inventors: Qiuwen Chen, Nanjing (CN); Hanlu Yan, Nanjing (CN); Jianyun Zhang, Nanjing (CN); Xueke Liao, Nanjing (CN); Tianqi Yao, Nanjing (CN); Zhiyuan Wang, Nanjing (CN); Cheng Chen, Nanjing (CN)

(73) Assignee: NANJING HYDRAULIC RESEARCH INSTITUTE, Nanjing (CN)

( * ) Notice: Subject to any disclaimer, the term of this patent is extended or adjusted under 35 U.S.C. 154(b) by 39 days.

(21) Appl. No.: 17/412,893

(22) Filed: Aug. 26, 2021

(65) Prior Publication Data

US 2022/0234906 A1 Jul. 28, 2022

(30) Foreign Application Priority Data

Jan. 28, 2021 (CN) .......................... 202110118099.5

(51) Int. Cl.
*C01F 7/785* (2022.01)
*C02F 1/28* (2023.01)
*C02F 101/36* (2006.01)

(52) U.S. Cl.
CPC .............. *C01F 7/785* (2022.01); *C02F 1/288* (2013.01); *C01P 2002/22* (2013.01); *C01P 2002/85* (2013.01); *C01P 2004/62* (2013.01); *C01P 2004/64* (2013.01); *C02F 1/281* (2013.01); *C02F 2101/36* (2013.01); *C02F 2305/08* (2013.01)

(58) Field of Classification Search
None
See application file for complete search history.

(56) References Cited

FOREIGN PATENT DOCUMENTS

CN 113173609 A * 7/2021

OTHER PUBLICATIONS

Song et al, CN 113173609 A, English Translation from FIT (Year: 2021).*

* cited by examiner

*Primary Examiner* — Colin W. Slifka
(74) *Attorney, Agent, or Firm* — CBM Patent Consulting, LLC

(57) ABSTRACT

It discloses a method for preparing a magnesium-aluminum hydrotalcite-loaded nano zero-valent iron material for specifically removing perfluorooctanoic acid in a water environment and an optimized process for removing perfluorooctanoic acid thereby, and relates to the technical field of removing persistent organic pollutants in water using adsorption method and oxidation-reduction method and, in particular, to a composite material prepared by loading a nano zero-valent iron on magnesium-aluminum hydrotalcite using liquid phase reduction method.

8 Claims, 4 Drawing Sheets

MAGNESIUM-ALUMINUM HYDROTALCITE-LOADED NANO ZERO-VALENT IRON COMPOSITE MATERIAL, METHOD FOR PREPARING SAME AND USE THEREOF

CROSS REFERENCES

This application claims priority to Chinese Patent Application Ser. No. CN2021101180995 filed on 28 Jan. 2021.

TECHNICAL FIELD

The present application relates to a sewage treatment technique and, in particular, to a magnesium-aluminum hydrotalcite-loaded nano zero-valent iron composite material, a method for preparing the same and use thereof.

BACKGROUND

Perfluorooctanoic acid (PFOA) is widely used in the industrial field due to its high surfactivity, high thermal stability, high chemical stability and both hydrophilicity and hydrophobicity. However, as PFOA is frequently detected in an environmental phase, the harm caused also has received attention. Research shows that PFOA has posed serious threats to human health due to its biological enrichment, biological amplification and toxicity, and has become a new type of highly-stressed refractory organic substance after organochlorine pesticides and dioxin. It has been reported that 14 types of perfluoroalkanoic acid compounds are detected in the water body of the Huangpu River, with the total amount ranging from 39.8 to 596.2 $ng·L^{-1}$, wherein PFOA and PFOS dominate with the averages being 139.6 $ng·L^{-1}$ and 46.5 $ng·L^{-1}$, respectively; the overall concentration of perfluorinated compounds in the Songhua River ranging from 0.143 to 1.41 $ng·L^{-1}$; the pollution is mainly caused by wastewater discharged from local sewage treatment plants, wherein PFOA has the highest detection rate with a concentration ranging from 0 to 0.678 $ng·L^{-1}$.

As the element F in PFOA has a strong electron inductive effect, C—F bonds with strong polarity and stability are formed, and besides, the C—C bonds can be protected from being broken due to perfluorination. Therefore, it is difficult to remove PFOA by using conventional methods. It has been reported recently that techniques such as biological method, oxidation method and reduction method can effectively remove PFOA in water environments. However, these techniques also have such defects as low energy-efficiency, complex procedures and strict conditions for reactions. The adsorption method is of great interest to scholars due to the advantages such as high cost-efficiency, simplified procedures, high efficiency and high practicability. The adsorbent is the core of the adsorption method. The adsorbent commonly used in water treatment mainly comprises activated carbon, clay, ion-exchange resins and the like. Activated carbon has a limited adsorption effect on pollutants in spite of its low cost, while ion exchange resins are expensive in spite of their good effect on removing PFOA. In addition, a single adsorption method further suffers from the disadvantage that pollutants are only transferred but not degraded, leading to the fact that the used adsorbent becomes hazardous waste.

Hydrotalcite, as an anionic nanoclay material, has a special layered structure, which can provide exchangeable interlayer anions for PFOA, and the space of which can be increased with the size of the adsorbed compound. Different from such microporous adsorbents as activated carbon, hydrotalcite does not have a reduced adsorption effect when PFOA micelle/semi-micelle is formed, but even have, to some degree, an improved effect on PFOA under such a condition. Nano zero-valent iron (NZVI for short) consists of zero-valent iron particles having a particle size of 1-100 nm and has a classic core-shell structure, namely a core of zero-valent iron and a shell of iron oxide. During the process of removing pollutants, the iron oxide shell serves as a site for adsorbing the pollutants, and the iron core serves as an electron donor for facilitating reduction reaction. However, due to its surfactivity and magnetic property, NZVI is often limited in its use and performance by the agglomeration of particles and the material's susceptibility to oxidation. In order to overcome the limit of NZVI being prone to be oxidized, to agglomerate and to be passivated to make NZVI work at full capacity, surface passivation and loading have become the focus of research on zero-valent iron materials in recent years.

SUMMARY

Purpose: Aiming at the prior art, the present application provides a magnesium-aluminum hydrotalcite-loaded nano zero-valent iron composite material, a method for preparing the same and use thereof.

Technical Scheme: The method for preparing the magnesium-aluminum hydrotalcite-loaded nano zero-valent iron composite material comprises:
  a. preparing a ferrous sulfate solution, bubbling nitrogen gas through the solution, adding magnesium-aluminum hydrotalcite, and stirring for mixing;
  b. dropwise adding a sodium borohydride solution to the mixed solution obtained in step (1) while stirring in a nitrogen atmosphere, and continuously stirring after the dropwise addition until a suspension is obtained; and
  c. centrifuging the suspension, washing the precipitate, and drying to obtain a magnesium-aluminum hydrotalcite-loaded nano zero-valent iron composite material.

In step (1), the magnesium-aluminum hydrotalcite is ground and passed through a 50-mesh sieve.

In step (2), the molar ratio of Fe' in the ferrous sulfate solution to $BH_4^-$ in the sodium borohydride solution is 1:2-1:4.

In step (2), the sodium borohydride solution is dropwise added to the ferrous solution at 2-5 mL/min with stirring at 400-450 rpm in the nitrogen atmosphere.

In step (2), the stirring at 400-450 rpm is continued for 10-30 min after the dropwise addition.

In step (3), the nano zero-valent iron in the prepared composite material has a particle size of 100-500 nm.

In step (3), the precipitate is washed with absolute ethanol and ultrapure water in sequence, and is preferably washed three times with absolute ethyl alcohol and then washed three times with ultrapure water.

In step (3), the centrifugation is performed at no less than 3000 rpm for no less than 10 min, and the precipitate is lyophilized after the washing.

The present application further discloses the magnesium-aluminum hydrotalcite-loaded nano zero-valent iron composite material prepared above, wherein the loaded zero-valent iron consists of a zero-valent iron core and an iron oxide shell, and the morphological characteristics of the zero-valent iron are retained in the loading process.

The present application further discloses use of the magnesium-aluminum hydrotalcite-loaded nano zero-valent iron composite material in removal of perfluorooctanoic acid.

Specifically, the magnesium-aluminum hydrotalcite-loaded nano zero-valent iron composite material is added to a PFOA solution at room temperature to remove PFOA by oscillation.

Preferably, the PFOA solution is added with the magnesium-aluminum hydrotalcite-loaded nano zero-valent iron composite material according to a solid-to-liquid ratio of 1 g/L, adjusted to pH 9.0 and reacted for 2 h.

The particle size of zero-valent iron directly influences whether or not the zero-valent iron can be successfully loaded on magnesium-aluminum hydrotalcite. In the present invention, a method for preparing a nano zero-valent iron that is suitable for being loaded on magnesium-aluminum hydrotalcite is developed. The key experimental steps comprise: preparing reaction solutions having a $Fe^{2+}$-to-$BH_4^-$ molar ratio of 1:2-1:4, and dropwise adding the sodium borohydride solution to the ferrous solution at 2-5 mL/min with stirring at 400-450 rpm in a nitrogen atmosphere. The nano zero-valent iron prepared using the method has a particle size of 100-500 nm and can be efficiently loaded on magnesium-aluminum hydrotalcite. In the present invention, the removal efficiencies for perfluorooctanoic acid by the composite material under different pH conditions are investigated to obtain an optimal pH value for water environments, and an efficient process for removing perfluorooctanoic acid is established.

In the present invention, according to the chemical properties of perfluorooctanoic acid, a magnesium-aluminum layered double hydroxide is synthesized by using hydrothermal method, and a nano zero-valent iron prepared by using a sodium borohydride reduction method is loaded thereon to prepare a functional nano zero-valent iron material, which is characterized in its surface morphology and microstructure and studied for its removal efficiencies for PFOA in different water environments and the removal mechanism so as to provide an efficient process for removing PFOA by the magnesium-aluminum hydrotalcite-loaded nano zero-valent iron.

Beneficial Effects: The present invention provides a method for preparing a magnesium-aluminum hydrotalcite-loaded nano zero-valent iron composite material for removing PFOA, which has the following advantages: (1) the starting materials are economic and readily available, the production is cost-efficient, energy-efficient and environment-friendly, and the product has high purity and a good application prospect; (2) the hydrotalcite prepared using the method has good settling property, and can overcome the limit of that conventional adsorbents are not easy to separate from water bodies after adsorption; (3) the hydrotalcite-loaded nano zero-valent iron composite material prepared using the method significantly improves the capability of the zero-valent iron to remove PFOA; as described in the removal effect on PFOA of Example 5, the removal efficiency for PFOA can be improved by 2-5 times by loading the nano zero-valent iron on hydrotalcite, particularly in water environments at pH 5.0 and pH 9.0.

DETAILED DESCRIPTION

Figure 1:
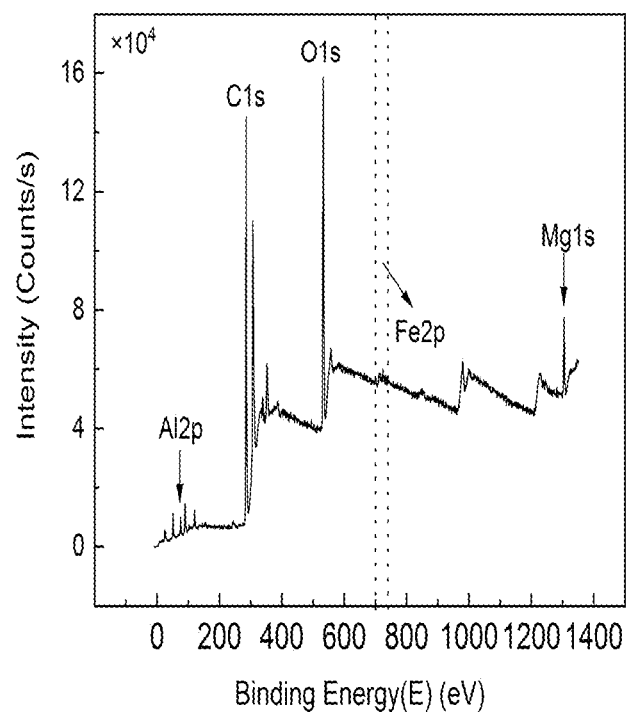
FIG. 1 is an X-ray photoelectron spectroscopy (XPS) survey spectrum of a composite material.

The present application will be further described in detail with reference to the drawings and specific embodiments.

Example 1. Preparation of Magnesium-Aluminum Hydrotalcite as Carrier a. Preparation of an alkali solution: 99.6306 g of solid sodium carbonate was added to a 2 L beaker, and dissolved in 1 L of ultrapure water to prepare a 0.94 mol/L sodium carbonate solution; 140 g of solid sodium hydroxide was added to the sodium carbonate solution to prepare a mixed alkaline solution.

b. Preparation of a metal solution: 84.5005 g of solid aluminum chloride hexahydrate and 142.31 g of solid magnesium chloride hexahydrate are dissolved in 0.7 L of ultrapure water to prepare a mixed metal solution having a magnesium-to-aluminum molar ratio of 2:1.

c. Dropwise addition of alkaline solution: the beaker containing the metal solution was placed into a water bath pot with magnetic stirring, and added with a stir bar; the mixed metal solution was added with the alkaline solution dropwise with magnetic stirring at 50 rpm in a water bath at 35° C.

d. Aging of slurry: after the dropwise addition, the water bath was heated to 65° C. and the stirring was continued at 80 rpm for 18 h.

e. Washing and drying of product: after the above steps are completed, the product was added to a centrifuge tube for centrifugation at 3000 rpm for 8 min, and the supernatant is removed, followed by 5 times of washing with ultrapure water; after the washing, the solid was stored in a refrigerator for 24 h of freezing, and then lyophilized in a vacuum drier; the dried powder obtained is the hydrotalcite carrier.

Example 2. Loading of Nano Zero-Valent Iron (Liquid Phase Reduction Method)

The magnesium-aluminum hydrotalcite prepared in Example 1 was used as a carrier, and loading of nano zero-valent iron was performed by in situ growth at a $Fe^{2+}$-to-$BH_4^-$ molar ratio of 1:2.

a. 8 g of the above magnesium-aluminum hydrotalcite carrier was carefully ground in a mortar and added to a 500 mL round-bottom flask.

b. Preparation of ferrous solution: 3.0025 g of solid ferrous sulfate heptahydrate was dissolved in 200 mL of ultrapure water to prepare a 0.054 mol/L ferrous sulfate solution.

c. Mixing of hydrotalcite and ferrous solution: the above ferrous sulfate heptahydrate solution was added to the flask and bubbled with nitrogen gas, and the hydrotalcite and the ferrous solution were stirred by using a mechanical stirring device for 30 min.

d. Preparation of sodium borohydride solution: 0.8165 g of solid sodium borohydride was dissolved in 200 mL of ultrapure water to prepare a 0.108 mol/L sodium borohydride solution.

e. Dropwise addition of sodium borohydride: 200 mL of the 0.108 mol/L sodium borohydride solution was dropwise added to the ferrous solution by using a peristaltic pump at 2 mL/min with mechanically stirring at 400 rpm in a nitrogen atmosphere, and after the dropwise addition, the stirring is continued for 20 min.

f. Washing and drying of product: after the stirring, the resultant suspension was added to a centrifugal tube for centrifugation at 3500 rpm for 10 min, and the supernatant is removed, followed by 3 times of washing with absolute ethanol and 3 times of washing with ultrapure water; the obtained solid was finally lyophilized to give the hydrotalcite-loaded nano zero-valent iron in the form of a powder.

Figure 2:
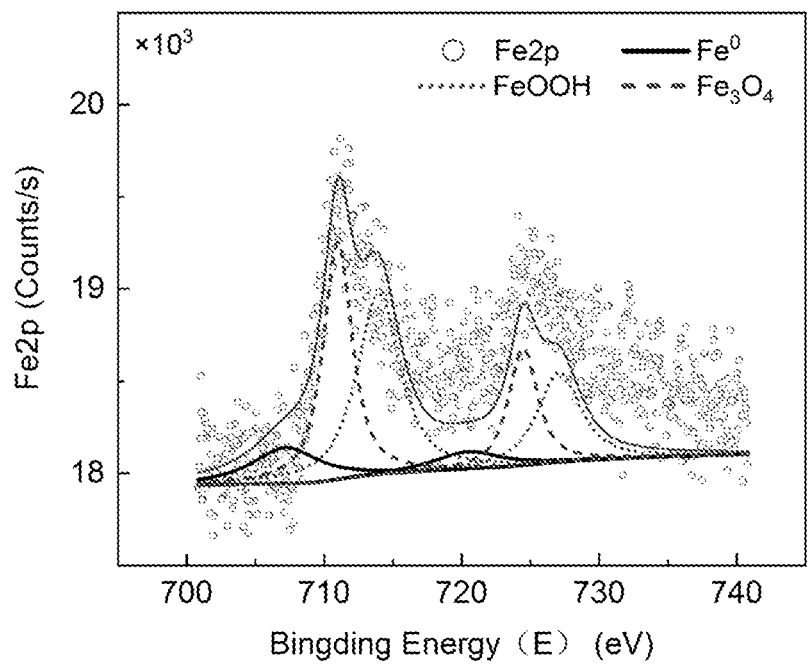
FIG. 2 shows the peak separation results of a narrow scan XPS spectrum of Fe2p of a composite material.

The obtained composite material was subjected to X-ray test, and the result is shown in FIG. 1. The peak for Fe can be observed according to the graph, demonstrating that the zero-valent iron was successfully loaded. The obtained composite material was further tested by X-ray photoelectron spectroscopy (XPS), and the XPS peak separation results of Fe in the composite material are shown in FIG. 2. The graph demonstrates that the loaded zero-valent iron consists of a zero-valent iron core and an iron oxide shell, and the morphological characteristics of the zero-valent iron were retained in the loading process.

Example 3. Loading of Nano Zero-Valent Iron (Liquid Phase Reduction Method)

Similarly to that in Example 2, the magnesium-aluminum hydrotalcite prepared in Example 1 was used as a carrier, and loading of nano zero-valent iron was performed by in situ growth at a $Fe^{2+}$-to-$BH_4^-$ molar ratio of 1:4.

a. 8 g of the above magnesium-aluminum hydrotalcite carrier was carefully ground in a mortar and added to a 500 mL round-bottom flask.

b. Preparation of ferrous solution: 2.3909 g of solid ferrous sulfate heptahydrate was dissolved in 200 mL of ultrapure water to prepare a 0.043 mol/L ferrous sulfate solution.

c. Mixing of hydrotalcite and ferrous solution: the above ferrous sulfate heptahydrate solution was added to the flask and bubbled with nitrogen gas, and the hydrotalcite and the ferrous solution were stirred by using a mechanical stirring device for 30 min.

d. Preparation of sodium borohydride solution: 1.2247 g of solid sodium borohydride was dissolved in 200 mL of ultrapure water to prepare a 0.162 mol/L sodium borohydride solution.

e. Dropwise addition of sodium borohydride: 200 mL of the 0.162 mol/L sodium borohydride solution was dropwise added to the ferrous solution by using a peristaltic pump at 5 mL/min with mechanically stirring at 450 rpm in a nitrogen atmosphere, and after the dropwise addition, the stirring is continued for 20 min.

f. Washing and drying of product: after the stirring, the resultant suspension was added to a centrifugal tube for centrifugation at 3500 rpm for 10 min, and the supernatant is removed, followed by 3 times of washing with absolute ethanol and 3 times of washing with ultrapure water; the obtained solid was finally lyophilized to give the hydrotalcite-loaded nano zero-valent iron in the form of a powder. The nano zero-valent iron can be loaded on magnesium-aluminum hydrotalcite successfully by using the $Fe^{2+}$-to-$BH_4^-$ molar ratios adopted in Example 2 and Example 3. When the $Fe^{2+}$-to-$BH_4^-$ molar ratio is greater than 1:2, Fe is not sufficiently reduced, and when the $Fe^{2+}$-to-$BH_4^-$ molar ratio is less than 1:4, sodium borohydride is wasted.

Example 4. Loading of Nano Zero-Valent Iron (Impregnation Reduction Method)

This loading method is similar to that in Example 2 except that in step (3), the hydrotalcite and the ferrous solution were stirred for 12 h and lyophilized to give a hydrotalcite powder having a surface rich in ferrous ions; a sodium borohydride solution was then added to reduce the ferrous ions on the surface to nano zero-valent iron, and the hydrotalcite-loaded nano zero-valent iron powder was thus obtained.

a. 4 g of hydrotalcite carrier was carefully ground and added to a 250 mL round-bottom flask.

b. Preparation of ferrous solution: 1.5013 g of solid ferrous sulfate heptahydrate was dissolved in 100 mL of ultrapure water to prepare a 0.054 mol/L ferrous sulfate solution.

c. Mixing of hydrotalcite and ferrous solution: after the suspension was continuously stirred for 12 h, the supernatant was removed, and the obtained solid was lyophilized.

d. Preparation of sodium borohydride solution: 0.4082 g of solid sodium borohydride was dissolved in 100 mL of ultrapure water to prepare a 0.108 mol/L sodium borohydride solution.

e. Reduction by sodium borohydride: 4 g of the dried powder was added with 100 mL of the 0.108 mol/L sodium borohydride solution with continuous stirring to react in a nitrogen atmosphere for 1 h.

f. Washing and drying of product: after the reaction was completed, the resultant suspension was added to a centrifuge tube, and washed 3 times with absolute ethanol and 3 times with ultrapure water; the obtained product was finally lyophilized to give the hydrotalcite-loaded nano zero-valent iron in the form of a powder.

Figure 3:
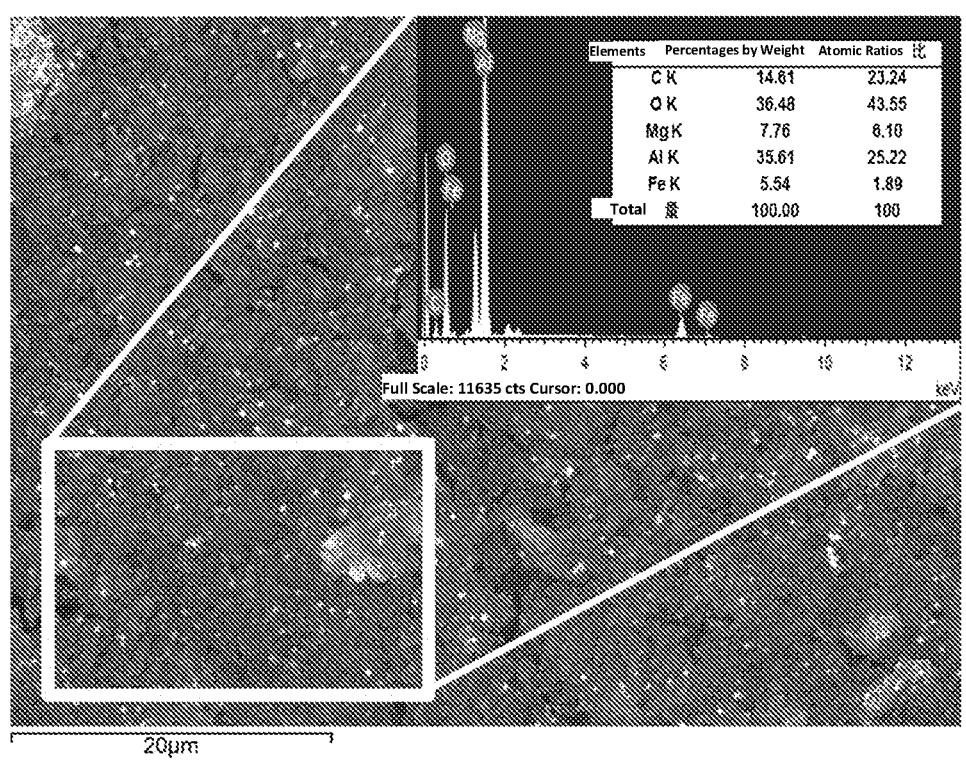
FIG. 3 is an EDS diagram of a composite material prepared by using liquid phase reduction method.
Figure 4:
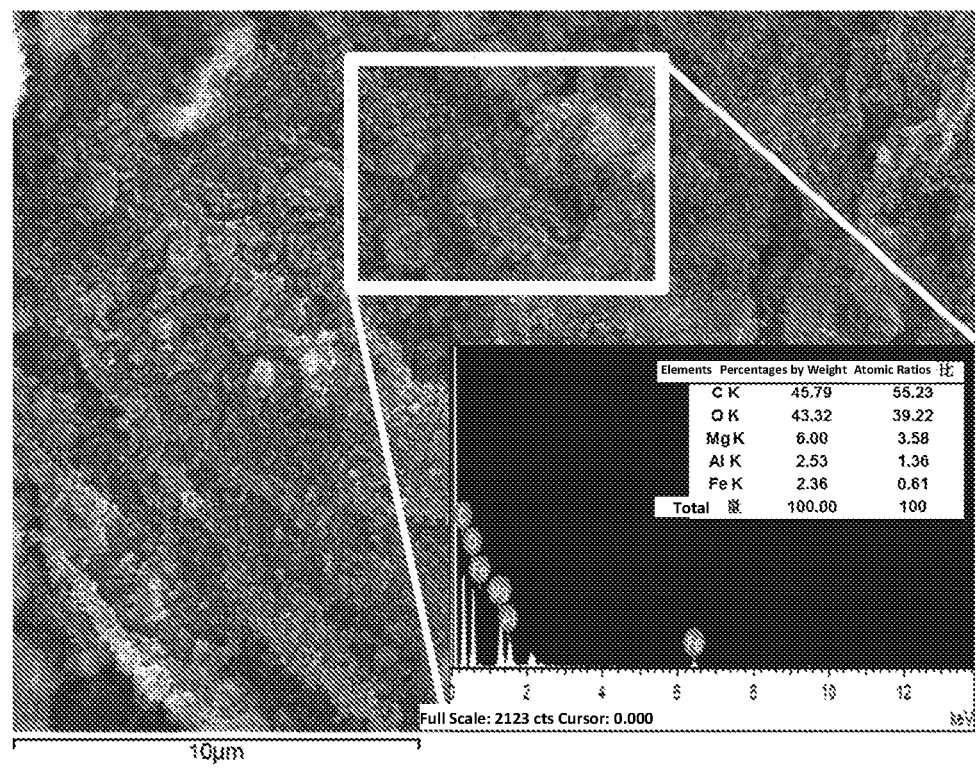
FIG. 4 is an EDS diagram of a composite material prepared by using impregnation reduction method.

Comparisons of the Fe adhesion ratios on the surfaces of the composite materials prepared by the liquid phase reduction method and the impregnation reduction method were made by EDS characterization, and the results are shown in FIG. 3 (Example 2) and FIG. 4 (Example 4). As can be seen from the graphs, the hydrotalcite-loaded nano zero-valent iron material prepared by using the liquid phase reduction method has higher Fe content on its surface, and the Fe atom percentage is up to 1.89% which is 3 times as much as that of the zero-valent iron material prepared by using the impregnation reduction method. Besides, the liquid phase reduction method has the advantages such as simplified procedures, no need for additional lyophilization, a short preparation period and high Fe loading capacity.

Example 5. Perfluorooctanoic Acid Removal Experiment and Process Optimization a. Perfluorooctanoic acid removal by hydrotalcite-loaded nano zero-valent iron: 0.1 g of hydrotalcite-loaded nano zero-valent iron powder (Example 2) was added to 100 mL of a 500 μg/L PFOA solution according to a solid-to-liquid ratio of 1 g/L, and the mixture was continuously shaken at 200 rpm and room temperature for 180 min to remove PFOA.

b. Sampling and measurement of perfluorooctanoic acid: after the reaction was completed, all experimental groups were sampled after 0 min, 5 min, 15 min, 30 min and 120 min, filtered through a 0.22 μm filter membrane, and subjected to PFOA concentration measurement by liquid chromatography-mass spectrometry (LC-MS).

c. Optimization of perfluorooctanoic acid removal process: 3 groups of 100 mL of the 500 μg/L PFOA reaction solution were added to erlenmeyer flasks, and were adjusted to pH 5, pH 7 and pH 9, respectively, with 1 mol/L HCl solution and 1 mol/L NaOH solution, followed by addition of 0.1 g of the hydrotalcite-loaded nano zero-valent iron powder. The erlenmeyer flasks were continuously shaken on a constant-temperature oscillator at room temperature for 2 h. The supernatant was filtered through a 0.22 μm PES membrane, and subjected to PFOA concentration measurement by liquid chromatography-mass spectrometry (LC-MS). The experimental group having the highest removal efficiency for PFOA was identified.

Figure 5:
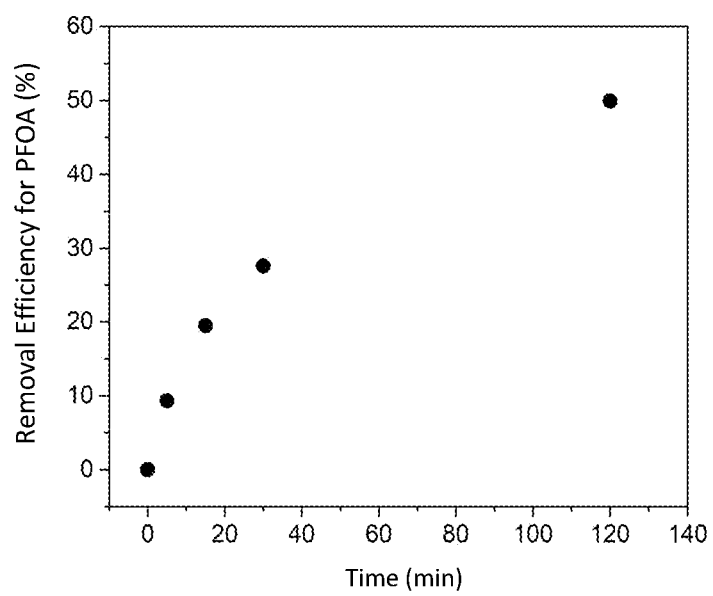
FIG. 5 shows the removal efficiencies for PFOA by a composite material at different time points.

In a first set of experiments, the removal efficiencies for PFOA by the magnesium-aluminum hydrotalcite-loaded nano zero-valent iron composite material at different time points were investigated, and the results are shown in FIG. 5. Under the conditions where the PFOA concentration was initially 500 μg/L, the pH value of the solution was initially 5.8 and was not controlled in the reaction process, and the amount of the material added was 1 g/L, the removal efficiency for PFOA by the composite material was as high as 49.9% after 2 h of reaction, while according to the published article "Application of zero-valent iron coupled with biochar for removal of perfluoroalkyl carboxylic and sulfonic acids from water under ambient environmental conditions" by YingYing Liu (2020, Science of the Total Environment), the removal efficiency for PFOA by zero-valent iron alone was only 20% after 120 days of reaction, and the removal efficiency for PFOA by a mixture of zero-valent iron and biochar was 57.2% after 120 days of reaction, demonstrating that the material of the present invention has an efficient capability of removing perfluorooctanoic acid.

Figure 6:
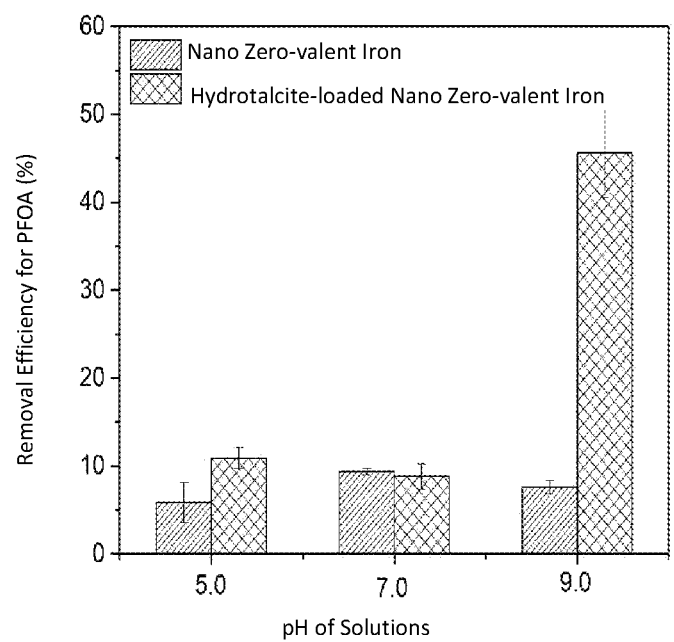
FIG. 6 shows the removal efficiencies for PFOA by a nano zero-valent iron and hydrotalcite-loaded nano zero-valent iron composite material in solutions at different pH values.

In a second set of experiments, the removal efficiency for PFOA by the composite material at different pH values was investigated. Under the conditions where the PFOA concentration was initially 500 μg/L and the amount of the material added was 1 g/L, the reaction was continued for 30 min, and the results are shown in FIG. 6. On the whole, by loading the nano zero-valent iron on magnesium-aluminum hydrotalcite, the removal efficiency for PFOA can be significantly improved, particularly, by 2-5 times in water environments at pH 5.0 and pH 9.0.

What is claimed is:

1. A method for preparing a magnesium-aluminum hydrotalcite-loaded nano zero-valent iron composite material, comprising:
    (1) preparing a ferrous sulfate solution, bubbling nitrogen gas through the solution, adding magnesium-aluminum hydrotalcite, and stirring for mixing;
    (2) dropwise adding a sodium borohydride solution to the mixed solution obtained in step (1) while stirring in a nitrogen atmosphere, and continuously stirring after the dropwise addition until a suspension is obtained; and
    (3) centrifuging the suspension to obtain precipitate, washing the precipitate, and drying to obtain a magnesium-aluminum hydrotalcite-loaded nano zero-valent iron composite material.

2. The method according to claim 1, wherein in step (1), the magnesium-aluminum hydrotalcite is ground and passed through a 50-mesh sieve.

3. The method according to claim 1, wherein in step (2), the molar ratio of $Fe^{2+}$ in the ferrous sulfate solution to $BH_4^-$ in the sodium borohydride solution is 1:2-1:4.

4. The method according to claim 1, wherein in step (2), the sodium borohydride solution is dropwise added to the ferrous solution at 2-5 mL/min with stirring at 400-450 rpm in the nitrogen atmosphere.

5. The method according to claim 1, wherein in step (2), the stirring at 400-450 rpm is continued for 10-30 min after the dropwise addition.

6. The method according to claim 1, wherein in step (3), the nano zero-valent iron in the prepared composite material has a particle size of 100-500 nm.

7. The method according to claim 1, wherein in step (3), the precipitate is washed with absolute ethanol and ultrapure water in sequence.

8. The method according to claim 1, wherein in step (3), the centrifugation is performed at no less than 3000 rpm for no less than 10 min.

* * * * *